United States Patent
Zhou et al.

(10) Patent No.: US 8,666,802 B2
(45) Date of Patent: Mar. 4, 2014

(54) CLASSIFYING LOCATIONS FOR AD PRESENTATION

(75) Inventors: Jian Zhou, Milpitas, CA (US); Anshul Kothari, Sunnyvale, CA (US); Subhadip Sarkar, Sunnyvale, CA (US); Theodore B. Van Belle, Santa Clara, CA (US); Surojit Chatterjee, Fremont, CA (US)

(73) Assignee: Google Inc., Mountain View, CA (US)

(*) Notice: Subject to any disclaimer, the term of this patent is extended or adjusted under 35 U.S.C. 154(b) by 178 days.

(21) Appl. No.: 13/111,833

(22) Filed: May 19, 2011

(65) Prior Publication Data

US 2011/0289090 A1     Nov. 24, 2011

Related U.S. Application Data

(60) Provisional application No. 61/346,875, filed on May 20, 2010.

(51) Int. Cl.
*G06Q 30/00* (2012.01)
(52) U.S. Cl.
USPC ..................................................... 705/14.1
(58) Field of Classification Search
USPC ..................................................... 705/14.1
See application file for complete search history.

(56) References Cited

U.S. PATENT DOCUMENTS

| 2002/0046114 A1 | 4/2002 | Kobayashi |
| 2005/0222989 A1 | 10/2005 | Haveliwala et al. |
| 2007/0011020 A1 | 1/2007 | Martin |
| 2008/0086356 A1* | 4/2008 | Glassman et al. ............. 705/10 |
| 2008/0243821 A1 | 10/2008 | Delli Santi et al. |
| 2010/0049609 A1 | 2/2010 | Zhao et al. |

OTHER PUBLICATIONS

International Search Report and Written Opinion from related PCT International Application No. PCT/US2011/037370 dated Feb. 9, 2012, 10 pages.
Authorized officer Simin Baharlou, International Preliminary Report on Patentability in PCT/US2011/037370, mailed Nov. 29, 2012, 7 pages.

* cited by examiner

*Primary Examiner* — Daniel Lastra
(74) *Attorney, Agent, or Firm* — Fish & Richardson P.C.

(57) ABSTRACT

This specification describes technologies relating to content presentation. In general, one aspect of the subject matter described in this specification can be embodied in methods that include the actions of receiving data from a plurality of users within a geographic region associated with a location; analyzing the received data to derive a category for the location; annotating the location with the category; and using the category to boost candidate content items for delivery to users in the location in response to future content item requests.

40 Claims, 4 Drawing Sheets

CLASSIFYING LOCATIONS FOR AD PRESENTATION

CROSS-REFERENCE TO RELATED APPLICATIONS

This application claims the benefit under 35 U.S.C. §119 (e) to U.S. Provisional Application Ser. No. 61/346,875, filed on May 20, 2010, which is incorporated by reference in its entirety.

BACKGROUND

The present disclosure relates to content presentation.

Advertisers provide advertisements in different forms in order to attract consumers. An advertisement ("ad") is a piece of information designed to be used in whole or part by a user, for example, a particular consumer. Ads can be provided in electronic form. For example, online ads can be provided as banner ads on a web page, as ads presented with search results, or as ads presented in a mobile application.

One can refer to the inclusion of an ad in a medium, e.g., a webpage or a mobile application, as an impression. An advertising system can include an ad in a webpage, for example, in response to one or more keywords in a user search query input to a search engine. If a user selects the presented ad (e.g., by "clicking" the ad), then the user is generally taken to another location associated with the ad, for example, to another, particular web page.

SUMMARY

This specification describes technologies relating to content presentation.

In general, one aspect of the subject matter described in this specification can be embodied in methods that include the actions of receiving data from a plurality of users within a geographic region associated with a location; analyzing the received data to derive a category for the location; annotating the location with the category; and using the category to boost candidate content items for delivery to users in the location in response to future content item requests. Other embodiments of this aspect include corresponding systems, apparatus, and computer program products.

These and other embodiments can optionally include one or more of the following features. The content items are advertisements. Receiving data includes receiving search queries. The method further includes determining a location of each user of the plurality of users based on received location information from the respective users. The received location information is global positioning system coordinates. The method further includes receiving a collection of user data across locations. Analyzing the received data further includes identifying categories as associated with particular user data; generating a distribution of categories associated with received user data from the location; generating a distribution of categories associated with the received user data across locations; and comparing the distributions for categories at the location that occur a threshold amount greater than for the same categories across locations.

Using the category to boost candidate content items further includes identifying candidate content items in response to a request to serve a content item to a user in the location; determining whether any content items of the candidate content items are associated with the category; and applying a weight to a score for each content items associated with the category. Each content item is associated with one or more categories specified by a creator of the content item. The amount of the applied weight can vary according to category. Determining whether the content items are associated with a category includes determining whether the content item is associated with all categories except for specifically excluded categories. The method further includes associating the received data with one or more times; and deriving one or more categories for the location for each of the one or more times.

In general, one aspect of the subject matter described in this specification can be embodied in methods that include the actions of receiving a request for a content item to present to a user; determining one or more candidate content items; identifying a location associated with the user; identifying the category associated with the location; determining whether the category matches the one or more candidate content items; boosting a score of each candidate content items determined to match the category; and selecting a content item of the one or more candidate content items to serve to the user using the scores for the candidate content items; and serving the content item to the user. Other embodiments of this aspect include corresponding systems, apparatus, and computer program products.

These and other embodiments can optionally include one or more of the following features. The content items are advertisements. Identifying a location associated with the user includes receiving location information from the user. Identifying the category associated with the location includes searching a mapping of location and categories. Each candidate ad is associated with one or more categories. The one or more categories are identified using advertiser supplied keywords. Selecting an ad of the one or more candidate ads includes selecting the ad having the highest score including any boosting.

Particular embodiments of the subject matter described in this specification can be implemented so as to realize one or more of the following advantages. Locations can be classified into one or more categories based on the user information collected from that location. Content items (e.g., ads) can be directed to a location based on categories assigned to that location.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Advertisers seek to have content items (e.g., ads) presented to users likely to be interested in the content items. For example, content items can be identified for particular users based on the user's location and characteristics of that location. In particular, locations can be associated with one or more categories indicative of the types or interests of people at that location. Content items matched to these categories can be boosted by a system when determining content items to serve to users at the location.

While reference will be made below to advertising systems and processes, other forms of content including other forms of sponsored content can be managed and presented in accordance with the description below.

Figure 1:
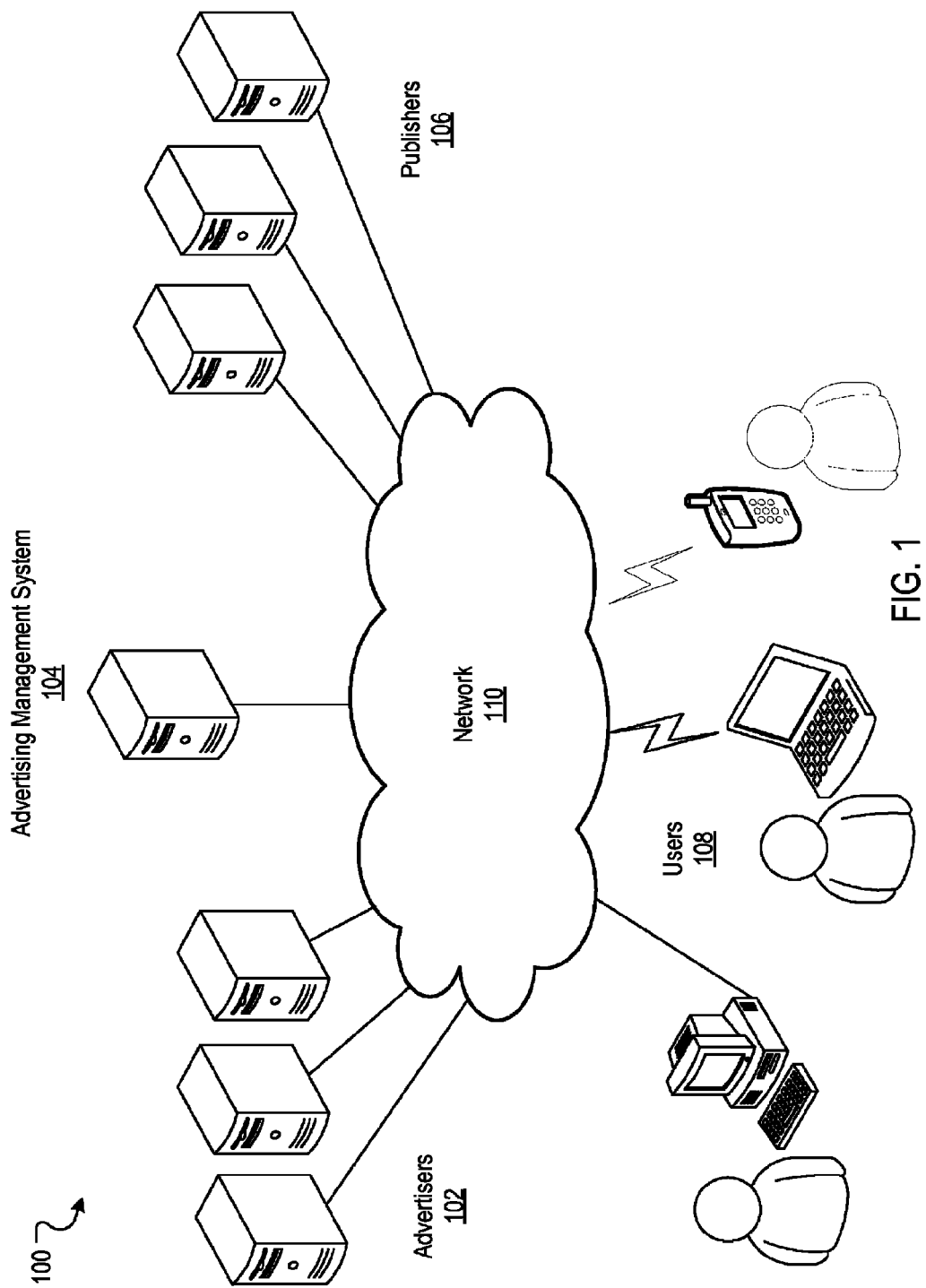
FIG. 1 is a block diagram showing an example content presentation system.

FIG. 1 is a block diagram showing an example content presentation system 100. In some implementations, one or more advertisers 102 can directly, or indirectly, enter, maintain, and log ad information in an advertising management system 104. Though reference is made to advertising, other forms of content, including other forms of sponsored content, can be delivered by the system 100. The ads can be in the form of graphical ads, such as banner ads, text-only ads, image ads, audio ads, video ads, ads combining one or more of any of such components, etc. The ads can also include embedded information, such as links, meta-information, and/or machine executable instructions.

One or more publishers 106 can submit requests for ads to the system 104. The system 104 responds by sending ads to the requesting publisher 106 for placement on, or association with, one or more of the publisher's content items (e.g., web properties). Example web properties can include web pages, television and radio advertising slots, or print media space.

Other entities, such as users 108 and the advertisers 102, can provide usage information to the system 104, such as, for example, whether or not a conversion (e.g., a purchase or other interaction including, for example, a request for driving directions to a location associated with an ad, navigating to the location associated with the ad, or walking to the location associated with the ad) or a click-through related to an ad (e.g., a user has selected an ad) has occurred. This usage information can include measured or observed user behavior related to ads that have been served. The system 104 may perform financial transactions, for example, crediting the publishers 106 and charging the advertisers 102 based on the usage information.

A network 110, such as a local area network (LAN), wide area network (WAN), the Internet, one or more telephony networks or a combination thereof, connects the advertisers 102, the system 104, the publishers 106, and the users 108.

One example publisher 106 is a general content server that receives requests for content (e.g., articles, discussion threads, music, video, graphics, search results, web page listings, information feeds, etc.), and retrieves the requested content in response to the request. The content server can submit a request for ads to an advertisement server in the system 104. The ad request can include a number of ads desired. The ad request can also include content request information. This information can include the content itself (e.g., page, video broadcast, radio show, or other type of content), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server or a client browser can combine the requested content with one or more of the ads provided by the system 104. The combined content and ads can be sent/rendered to the users 108 that requested the content for presentation in a viewer (e.g., a browser or other content display system). The content server can transmit information about the ads back to the advertisement server, including information describing how, when, and/or where the ads are to be rendered (e.g., in HTML or JavaScript™)

Another example publisher 106 is a search service. A search service can receive queries for search results. In response, the search service can retrieve relevant search results from an index of documents (e.g., from an index of web pages). Search results can include, for example, lists of web page titles, snippets of text extracted from those web pages, and hypertext links to those web pages, and can be grouped into a predetermined number of (e.g., ten) search results.

The search service can submit a request for ads to the system 104. The request can include a number of ads desired. This number can depend on the search results, the amount of screen or page space occupied by the search results, the size and shape of the ads, etc. In some implementations, the number of desired ads will be from one to ten, or from three to five. The request for ads can also include the query (as entered or parsed), information based on the query (such as geo-location information, whether the query came from an affiliate and an identifier of such an affiliate), and/or information associated with, or based on, the search results. Such information can include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

In some implementations, the advertisement management system 104 includes an auction process to select ads from the advertisers 102. For example, the advertisers 102 can be permitted to select, or bid, an amount the advertisers are willing to pay for each presentation of or interaction with (e.g., click of) an ad, e.g., a cost-per-click amount an advertiser pays when, for example, a user clicks on an ad. The cost-per-click can include a maximum cost-per-click, e.g., the maximum amount the advertiser is willing to pay for each click of an ad based on a keyword, e.g., a word or words in a query. Other bid types, however, can also be used. Based on these bids, ads can be selected and ranked for presentation.

The search service can combine the search results with one or more of the ads provided by the system 104. This combined information can then be forwarded to the users 108 that requested the content. The search results can be maintained as distinct from the ads, so as not to confuse the user between paid ads and presumably neutral search results.

In some implementations, one or more publishers 106 can submit requests for ads to the advertising management system 104. The system 104 responds by sending ads to the requesting publisher 106 for placement on one or more of the publisher's web properties (e.g., websites and other network-distributed content) that are relevant to the web property. For example, if a publisher 106 publishes a sports-related web site, the advertising management system can provide sports-related ads to the publisher 106. In some implementations, the requests can instead be executed by devices associated with the user 108, e.g., by the execution of a particular script when the publishers web page is loading on a client device.

In some alternative implementations, an ad push model is used to provide ads from advertisers 102. In an ad push model, ads can be pushed to idle screens (e.g., of a mobile devices or particular applications) based on particular criteria (e.g., the user's location).

Another example publisher 106 is a mobile application developer. A mobile application is an application specifically designed for operation on a mobile device (e.g., a smart phone). The mobile application can also include ads positioned within the content of the mobile application. Similarly to publishers 106, the ads can be received from the system 104 for placement in the mobile application when accessed by a user (e.g., when a particular page of a mobile application is loaded on the mobile device).

Figure 2:
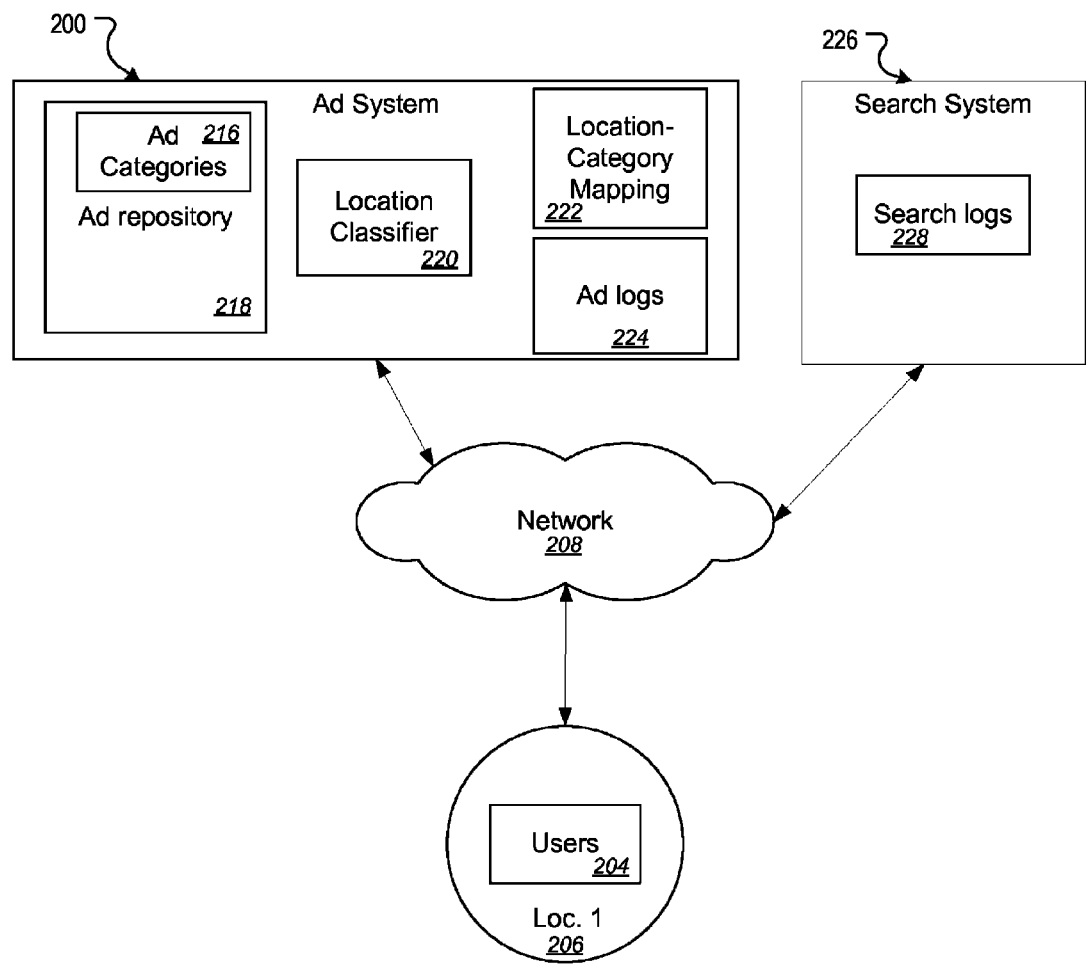
FIG. 2 is a block diagram of an example ad system including a location-category mapping.

FIG. 2 is a block diagram of an example ad system 200 including location-category mappings 222. The ad system 200 can interact with users 204 at a location 206 and a search system 226 through a network 208. The network 208, e.g., a local area network (LAN), wide area network (WAN), the Internet, one or more telephony networks, cellular networks, or a combination thereof, allows for communication between the ad system 200, the users 204, and the search system 226, among others.

Specifically, the users 204 can receive one or more ads, directly or indirectly, from the ad system 200. Additionally, the users 204 can provide location information to the ad system 200 and/or the search system 226. For example, each user 204 can be associated with a mobile device at a location 206. The mobile device can include location information, e.g., global positioning system (GPS) coordinates, which can be provided to the ad manager 202.

The location of a user can be, or be associated with, a geographic area, place, or region and can refer to, for example, GPS (Global Positioning Satellite) coordinates (e.g., latitude and longitude), address locations, or a region surrounding particular GPS coordinates. A region can be defined as an area within a particular distance (e.g., one hundred feet) of particular GPS coordinates. As another example, the location can be a semantic location or a region surrounding a semantic location. A semantic location can be, for example, a shopping mall, a park, a landmark, or some other area of interest.

In some implementations, the user location information is aggregated across users so that individually identifying information is anonymized while still maintaining the attributes or characteristics associated with the location information. In some other implementations, the location information is anonymized (so that the originating mobile device or mobile device user is unidentifiable) before transmission to the ad system. In this way, the actions of individual users can be obscured or unobservable while still permitting analysis based on user locations. Additionally, in some implementations, individual users can opt-in to providing location information to the ad server. In some other implementations, users can opt-out of providing location information. Thus users can opt-in or opt-out of providing location information to allow the system to analyze locations for ads as well as to receive ads directed to their location.

The ad system 200 includes an ads repository 218, one or more of which can be associated with one or more ad categories 216. The ad system 200 also includes a location classifier 220, a location-category mapping 222, and ad logs 224. The location classifier 220 classifies locations as belonging to a particular category or categories. In some implementations, a particular location can be classified as belonging to different categories at different times or dates (e.g., a first category during the day and a second category during the evening or a particular category during a particular time of year such as a festival). For example, a financial district in a city can have people that tend to be older and affluent. Thus, the financial center can be classified based on the characteristics of those users (e.g., their searches).

Search logs 228 for users in the location can be used to classify the location. In particular, the location classifier 220 can interact with a search system 226 to identify content from the search logs 228 associated with the location. For example, the search logs 228 can include query logs identifying search queries submitted by one or more users at a given location. Classifying locations is described in greater detail below with respect to FIG. 3.

The location-category mapping 222 associates a particular location with one or more categories. Thus, for a given location, and optionally a given time and/or date, the location-category mapping 222 can be used to relate one or more categories for the location.

Ad logs 224 allow the ad system 200 to log ads presented to users 204 and any conversions associated with the presented ads. For example, the ad logs 224 can identify particular ads presented to individual users (e.g., impressions). The ad logs 224 can also include a log of conversions associated with the presented ads (e.g., conversion events associated with particular user actions responsive to a presented ad).

Figure 3:
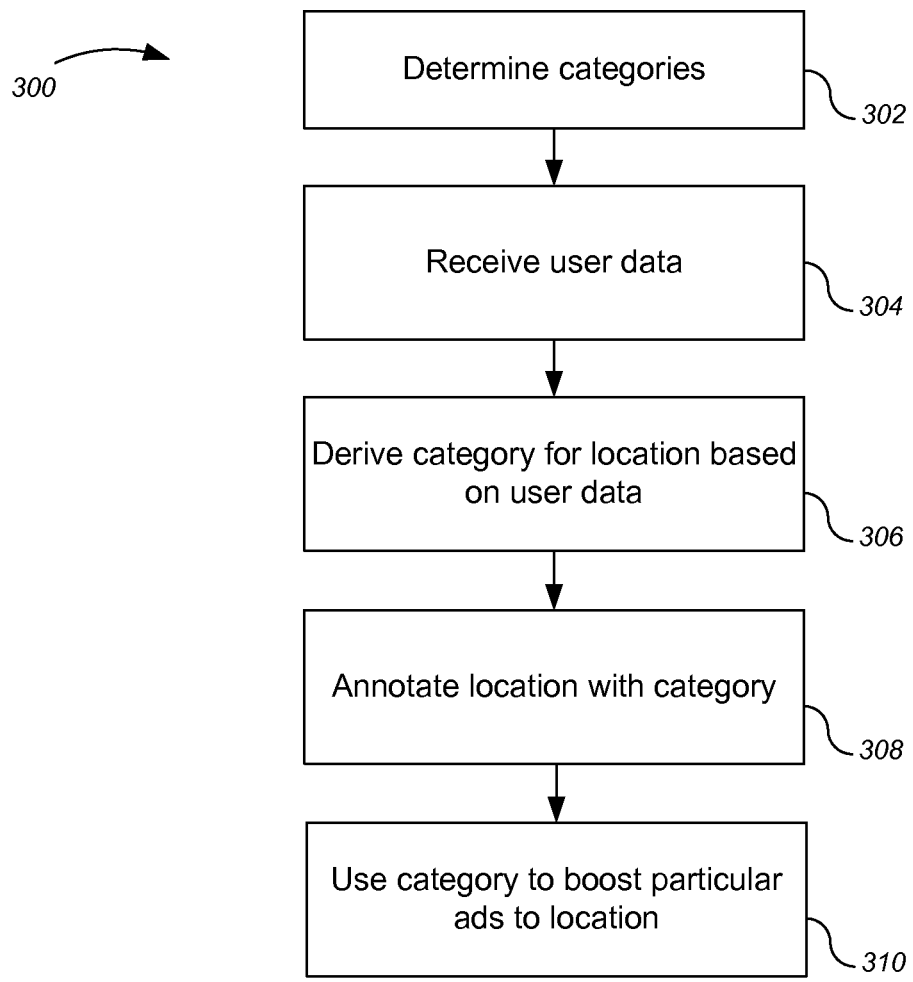
FIG. 3 is a flow chart of an example process for associating a location with a category.

FIG. 3 is a flow chart of an example process 300 for associating a location with a category. The process 300 can be performed, for example, by the ad system 200 of FIG. 2.

A collection of categories is identified (302). The collection of categories includes one or more categories that can be associated with locations. The collection of categories can be identified by manual input (e.g., defined by one or more individuals) or according to particular data processing techniques. For example, the categories can be extracted from one or more existing sets of categories or data sets can be processed to derive categories. The categories can be derived by the ad system or can, alternatively, be received from an external source. Received categories can be filtered to a smaller number of categories according to one or more criteria.

Categories can be determined in various different ways. For example, categories can be based on surveying sample groups of users at different locations, classifying users at different locations based on the purchasing behavior of those users, classifying users at different locations based on search queries, ad clicks, or other input of those users, and classifying users based on particular mobile applications.

User data is received (304). For example, the user data can be received by a location classifier (e.g., location classifier 220) from a search system (e.g., search system 226). In particular, the user data can include query logs for search queries submitted by users within a specified location, e.g., within a geographic region or area associated with a specified location. In some implementations, search results responsive to the search queries are also identified. For example, the ad classifier can receive search results corresponding to the queries or, alternatively, the ad classifier can interact with the search system to identify search results for each query submitted by users at the location. In some implementations, user data is more specific, for example, the user data can be particular to specific times of day or date ranges (e.g., based on timestamps of search logs).

One or more categories are derived for a particular location (306). In some implementations, search information can be analyzed to identify one or more relevant categories associated with each result. For example, the queries submitted at the location can analyzed according to the terms in the query. Additionally, the search results can be analyzed, in particular, those search results receiving the greatest number of clicks for submitted queries at the location. Additionally, query refinements can be used (e.g., subsequent user modifications of a submitted query) to identify categories for the location.

A distribution of categories across search results can be maintained for the location (e.g., as a histogram of categories and indicating the frequency of each category occurring in search data for the location). A similar baseline distribution can be generated for search queries in general (e.g., without consideration of location). For example, general search results can be received for a specific period of time from many different locations. For a given location, the distribution of categories for the location can be compared to the baseline distribution of categories to identify significant categories for the location (e.g., categories that occur significantly more often for the location relative to the baseline distribution).

For example, at a given location the number of query results associated with a category of home improvements can be greater than the baseline occurrence of that category in query results. If the difference relative to the baseline distribution is greater than a specified threshold, than the location can be annotated with the category "home improvement." The distribution can be generated for the location in general or can be refined to particular times or dates (e.g., different category distributions can be created from search queries at particular times).

Locations are annotated with the associated categories (308). For example, a location-category mapping (e.g., location-category mapping 222) can be used to annotate locations with particular categories (e.g., in a table).

The categories associated with a location can be used to boost ads matching those categories to users at that location (310). Boosting ads using category-location associations are described in greater detail below with respect to FIG. 4.

Figure 4:
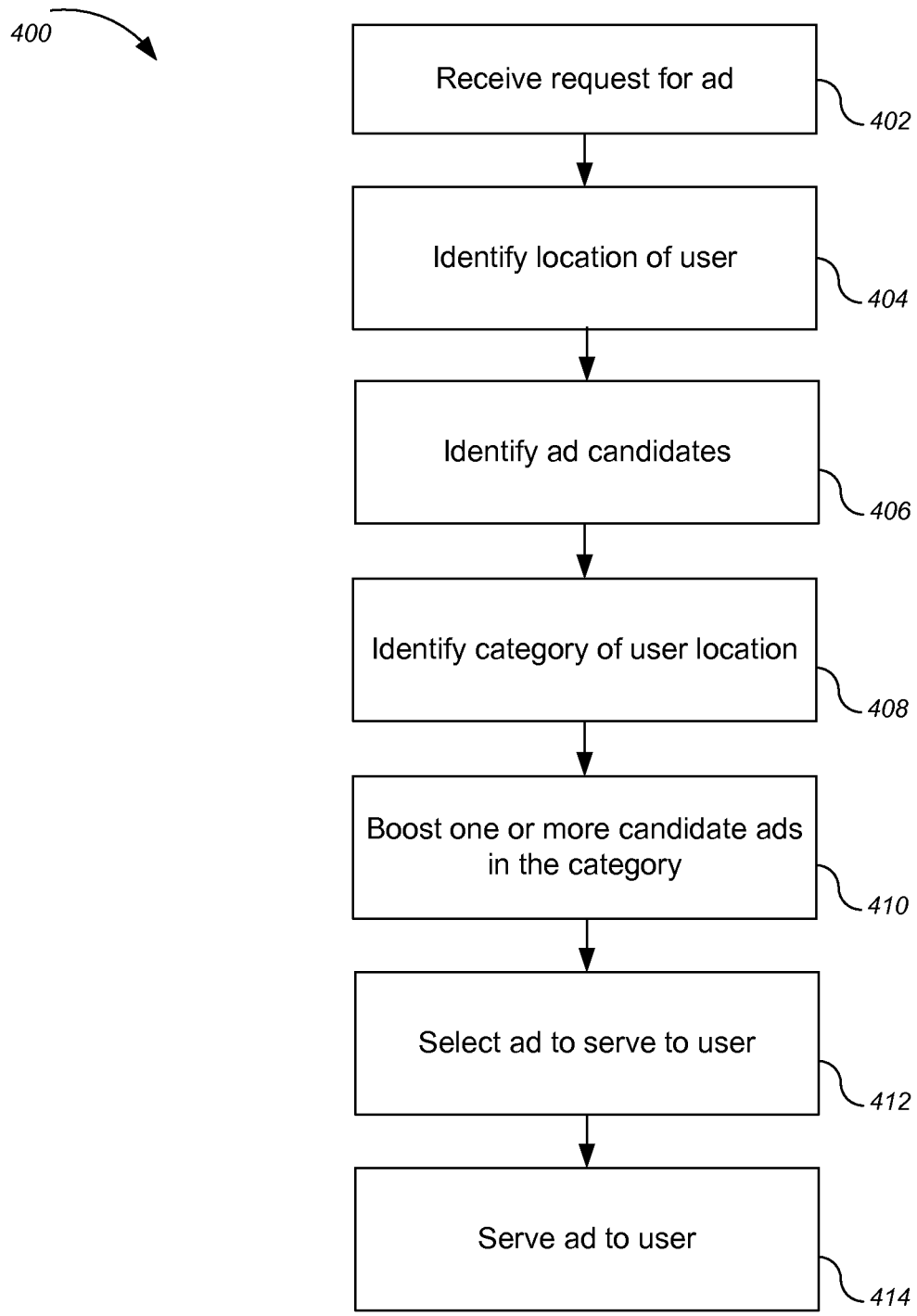
FIG. 4 is a flow chart of an example process for serving an ad.

FIG. 4 is a flow chart of an example process 400 for serving an ad. The process 400 can be performed, for example, by the ad system 200 of FIG. 2.

A request for one or more ads is received (402). For example, the ad manager can receive an ad request from a user's device (e.g., a user's browser or mobile application). Alternatively, the ad system can receive an ad request from a publisher providing content to the user (e.g., a web page, search results, etc.). For example, a user of a mobile device at a given location can use a mobile browser to initiate a search (e.g., by inputting a search query to a search field). Presenting a page of search results can also include presenting one or more ads on the results page. Thus, the ads are requested from the ad system in order to render the search results page including one or more ads.

Candidate ads are identified (404). Candidate ads can be identified using various information. For example, keywords, user information (profile, demographics, location generally), and publishers content can be used to identify candidate ads. For example, ads can be associated with particular keywords that can be matched to other content (e.g., search query terms, web page text). Additionally, user information can identify likely interests of the user which can be matched to ad keywords. In some implementations, candidate ads are scored based on various factors including the advertiser's financial agreements with the ad system (e.g., cost per impression), and the degree to which the ad matches the other content. Candidate ads can be ranked in order according to their score.

Each candidate ad can be associated with one or more categories. In some implementations, the categories are identified based on the ad content (e.g., ad text) or keywords assigned to the ad for use in directing ads to particular users. In some implementations, advertisers can specifically identify categories for the ad. For example, advertiser could direct ads to categories such as 'all financial districts,' all 'university towns,' or all 'tourist places'. Alternatively, in some implementations, advertisers can specifically exclude particular categories, for example, an ad can be matched to all categories except 'residential locations.'

In some implementations, advertisers have the ability to differentially bid for different categories. For example, advertiser may be willing to bid higher for a certain keyword for showing the ad in financial district versus showing the ad in tourist towns. The bids can depend on the conversion rates they experience from people looking at ads in different locations. The advertiser's bid can be used to adjust the score for a matching candidate ad of that category.

The location of the user is identified (406). In particular, the user location can be received with the ad request. The user location can be, for example, a specific GPS coordinates, a geographic region surrounding particular GPS coordinates, an address, or a semantic location (e.g., a business). In some implementations, the user location can be obtained from an internet protocol address (IP address), a user setting/choosing specific location before issuing a query, or user input specifying a location in a query. In some implementations, the location is a particular location associated with a geographic area or region in which the user is located (e.g., the bounds of a city).

One or more category associated with the user location is identified (408). A mapping of locations and categories can be used to identify categories associated with the user locations (e.g., the location-category mapping 222 of FIG. 2). In some implementations, the user's location is required to exactly match the category locations in order to identify a match. In some other implementations, the degree of match is flexible. For example, the user location can be identified within a specific range of GPS coordinates identified for the category. In another example, locations are defined by a hierarchy in which the user location and category location need only match a next higher level in the hierarchy (e.g., a user location of "Post Street" and a category location of "Market Street" both match the higher location level of "San Francisco").

Candidate ads matching the one or more categories are boosted (410). In particular, as described above, each candidate ad has an associated score. The candidate ads can be ranked in an order defined by the respective scores. The score for the candidate ads matching the one or more categories can be adjusted, increasing the score (e.g., by adding an additional weight to a scoring function or by adding a specified amount or percentage to the score). The adjusted score may or may not change the ranking of the ad depending on the score of the ads above the candidate ad in the ranking order.

One or more ads to serve to the user are selected (412). In some implementation, the highest ranked candidate ad or ads are selected. The number of candidate ads selected for presentation to the user can depend on the number of ads requested. The highest ranked candidate ad or ads may or may not include a boosted category ad. For example, the difference between two candidate ads in the ranking can be greater than the amount of the change in score from the boosting such that the relative position of the two candidate ads is unchanged. Alternatively, in another example, the change in score from the boosting can cause the score of the boosted candidate ad to be greater than one or more higher ranked ads. In such a scenario, the ranking is reordered to position the boosted ad ahead of those candidate ads.

The selected one or more ads are served to the user (414). In some implementations, the ad system provides the selected ads directly to the user's device (e.g., for incorporation into content presented on the device. For example, a user's mobile browser can integrate the ads into presented web content.

Alternatively, mobile applications can incorporate received ads into the displayed application content. In some other implementations, the ads are sent to a publisher (e.g., publishers 106) for incorporation into content prior to sending the content to the user. For example, the ads can be sent to a search system for incorporation into a search results web page that is then sent to the user for display.

In some implementations, category based ad information can be combined with one or more other types of techniques for directing ads to particular users (e.g., geographic or interest based techniques). The final score for a collection of candidate ads can be based on a combination of the different techniques.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
    receiving search data from a plurality of users within a geographic region associated with a location;
    analyzing the received search data to derive one or more categories for the location, wherein each of the one or more categories are determined to be significant categories for the location;
    annotating the location with the one or more categories; and
    using the one or more categories to boost candidate content items for delivery to users in the geographic region associated with the location in response to future content item requests.

2. The method of claim 1, where the content items are advertisements.

3. The method of claim 1, where receiving data includes receiving search queries.

4. The method of claim 1, further comprising:
    determining a location of each user of the plurality of users based on received location information from the respective users.

5. The method of claim 4, where the received location information is global positioning system coordinates.

6. The method of claim 1, further comprising:
    receiving a collection of user search data across locations.

7. The method of claim 6, where analyzing the received data further comprises:
    determining a collection of categories;
    generating a first distribution of categories associated with received search data from the location;
    generating a baseline distribution of categories associated with the collection of user search data across locations; and
    comparing the first distribution of categories for the location with the baseline distribution of categories across locations to determine the one or more significant categories for the location.

8. The method of claim 1, where using the one or more categories to boost candidate content items further comprises:
    identifying candidate content items in response to a request to serve a content item to a user in the location;
    determining whether any content items of the candidate content items are associated with the one or more categories; and
    applying a weight to a score for each content items associated with a category of the one or more categories.

9. The method of claim 8, where each content item is associated with one or more categories specified by a creator of the content item.

10. The method of claim 8, where the amount of the applied weight can vary according to category.

11. The method of claim 8, where determining whether the content items are associated with a particular category includes determining whether the content item is associated with all categories except for specifically excluded categories.

12. The method of claim 1, further comprising:
    associating the received data with one or more times; and
    deriving one or more categories for the location for each of the one or more times.

13. A method performed by data processing apparatus, the method comprising:
    receiving a request for a content item to present to a user;
    determining one or more candidate content items;
    identifying a location associated with the user;
    identifying the category associated with the location;
    determining whether the category matches the one or more candidate content items;

boosting a score of each candidate content items determined to match the category; and selecting a content item of the one or more candidate content items to serve to the user using the scores for the candidate content items; and serving the content item to the user.

14. The method of claim 13, where the content items are advertisements.

15. The method of claim 13, where identifying a location associated with the user includes receiving location information from the user.

16. The method of claim 13, where identifying the category associated with the location includes searching a mapping of location and categories.

17. The method of claim 13, where each candidate ad is associated with one or more categories.

18. The method of claim 17, where the one or more categories are identified using advertiser supplied keywords.

19. The method of claim 13, where selecting an ad of the one or more candidate ads includes selecting the ad having the highest score including any boosting.

20. A system comprising:
one or more processors configured to interact with a computer storage medium in order to perform operations comprising:
receiving search data from a plurality of users within a geographic region associated with a location;
analyzing the received search data to derive one or more categories for the location, wherein each of the one or more categories are determined to be significant categories for the location;
annotating the location with the one or more categories; and
using the one or more categories to boost candidate content items for delivery to users in the geographic region associated with the location in response to future content item requests.

21. The system of claim 20, where the content items are advertisements.

22. The system of claim 20, where receiving data includes receiving search queries.

23. The system of claim 20, further configured to perform operations comprising:
determining a location of each user of the plurality of users based on received location information from the respective users.

24. The system of claim 23, where the received location information is global positioning system coordinates.

25. The system of claim 20, further configured to perform operations comprising:
receiving a collection of user search data across locations.

26. The system of claim 20, where analyzing the received data further comprises:
determining a collection of categories;
generating a first distribution of categories associated with received search data from the location;
generating a baseline distribution of categories associated with the collection of user search data across locations; and
comparing the first distribution of categories for the location with the baseline distribution of categories across locations to determine the one or more significant categories for the location.

27. The system of claim 20, where using the one or more categories to boost candidate content items further comprises:

identifying candidate content items in response to a request to serve a content item to a user in the location;
determining whether any content items of the candidate content items are associated with the one or more categories; and
applying a weight to a score for each content items associated with a category of the one or more categories.

28. The system of claim 27, where each content item is associated with one or more categories specified by a creator of the content item.

29. The system of claim 27, where the amount of the applied weight can vary according to category.

30. The system of claim 27, where determining whether the content items are associated with a particular category includes determining whether the content item is associated with all categories except for specifically excluded categories.

31. The system of claim 20, further configured to perform operations comprising:
associating the received data with one or more times; and
deriving one or more categories for the location for each of the one or more times.

32. A system comprising:
one or more processors configured to interact with a computer storage medium in order to perform operations comprising:
receiving a request for a content item to present to a user;
determining one or more candidate content items;
identifying a location associated with the user;
identifying the category associated with the location;
determining whether the category matches the one or more candidate content items;
boosting a score of each candidate content items determined to match the category; and
selecting a content item of the one or more candidate content items to serve to the user using the scores for the candidate content items; and
serving the content item to the user.

33. The system of claim 32, where the content items are advertisements.

34. The system of claim 32, where identifying a location associated with the user includes receiving location information from the user.

35. The system of claim 32, where identifying the category associated with the location includes searching a mapping of location and categories.

36. The system of claim 32, where each candidate ad is associated with one or more categories.

37. The system of claim 36, where the one or more categories are identified using advertiser supplied keywords.

38. The system of claim 32, where selecting an ad of the one or more candidate ads includes selecting the ad having the highest score including any boosting.

39. A computer storage medium encoded with a computer program, the program comprising instructions that when executed by data processing apparatus cause the data processing apparatus to perform operations comprising:
receiving search data from a plurality of users within a geographic region associated with a location;
analyzing the received search data to derive one or more categories for the location, wherein each of the one or more categories are determined to be significant categories for the location;
annotating the location with the one or more categories; and using the one or more categories to boost candidate content items for delivery to users in the geographic region associated with the location in response to future content item requests.

40. A computer storage medium encoded with a computer program, the program comprising instructions that when executed by data processing apparatus cause the data processing apparatus to perform operations comprising:
   receiving a request for a content item to present to a user;
   determining one or more candidate content items;
   identifying a location associated with the user;
   identifying the category associated with the location;
   determining whether the category matches the one or more candidate content items;
   boosting a score of each candidate content items determined to match the category; and
   selecting a content item of the one or more candidate content items to serve to the user using the scores for the candidate content items; and
   serving the content item to the user.

* * * * *